US010566099B2

(12) United States Patent
Hummel (10) Patent No.: US 10,566,099 B2
(45) Date of Patent: Feb. 18, 2020

(54) DEVICE AND METHOD FOR CHECKING A FUEL ROD OF A FUEL ELEMENT (71) Applicant: FRAMATOME GmbH, Erlangen (DE)

(72) Inventor: Wolfgang Hummel, Neumarkt (DE)

(73) Assignee: Framatome GmbH, Erlangen (DE)

( * ) Notice: Subject to any disclaimer, the term of this patent is extended or adjusted under 35 U.S.C. 154(b) by 190 days.

(21) Appl. No.: 15/552,958

(22) PCT Filed: Feb. 5, 2016

(86) PCT No.: PCT/EP2016/052528
§ 371 (c)(1),
(2) Date: Aug. 23, 2017

(87) PCT Pub. No.: WO2016/134956
PCT Pub. Date: Sep. 1, 2016

(65) Prior Publication Data
US 2018/0033502 A1  Feb. 1, 2018

(30) Foreign Application Priority Data

Feb. 25, 2015 (DE) .................. 10 2015 102 732

(51) Int. Cl.
G21C 17/06 (2006.01)
G21C 17/07 (2006.01)

(52) U.S. Cl.
CPC ............ G21C 17/06 (2013.01); G21C 17/07 (2013.01)

(58) Field of Classification Search
CPC ....... G21C 17/002; G21C 17/06; G21C 17/07
See application file for complete search history.

(56) References Cited

U.S. PATENT DOCUMENTS 4,016,749 A  4/1977  Wachter
5,192,846 A  3/1993  Duthoo
(Continued)

FOREIGN PATENT DOCUMENTS

DE  2158572 A  6/1973
DE  2424431 A1  12/1975
(Continued)

OTHER PUBLICATIONS

International Preliminary Report on Patentability as received in PCT/EP2016/052528 dated Sep. 8, 2017.
(Continued)

Primary Examiner — Sharon M Davis
(74) Attorney, Agent, or Firm — Keller Jolley Preece (57) ABSTRACT The disclosure relates to a device for checking a fuel rod comprising a testing container having first and second chambers, a first checking device arranged in the testing container, wherein the testing container has at least one inlet opening, at least one outlet opening, and an insertion opening for inserting the fuel rod into the second chamber, and wherein a valve is arranged in a connecting channel connecting the first and the second chamber. A method is disclosed for checking a fuel rod in a water-filled basin of a submerged nuclear plant having such a device, wherein the fuel rod is inserted into the second chamber of the testing container through the insertion opening while the valve is closed, wherein a fluid is fed in via the at least one inlet opening, and wherein the valve is opened in order to check the fuel rod with the first checking device.

19 Claims, 3 Drawing Sheets (56) References Cited

U.S. PATENT DOCUMENTS

| | | | |
|---|---|---|---|
| 8,842,796 B2 | 9/2014 | Aleshin et al. | |
| 2007/0248239 A1* | 10/2007 | Mahe | G01N 21/952 382/100 |
| 2013/0129029 A1* | 5/2013 | Aleshin | G21C 17/06 376/247 |

FOREIGN PATENT DOCUMENTS

| | | | |
|---|---|---|---|
| DE | 102006010620 A1 | 6/2007 | |
| EP | 2208206 B1 | 6/2011 | |
| EP | 2442312 * | 4/2012 | G21C 17/06 |
| FR | 2509898 A1 | 1/1983 | |
| WO | WO 2007/071337 A1 | 6/2007 | |
| WO | WO 2016/134956 A1 | 9/2016 | |

OTHER PUBLICATIONS

Written Opinion as received in PCT/EP2016/052528 dated May 2, 2016.

* cited by examiner

DEVICE AND METHOD FOR CHECKING A FUEL ROD OF A FUEL ELEMENT

CROSS-REFERENCE TO RELATED APPLICATIONS

This application is a national phase entry under 35 U.S.C. § 371 of International Application No. PCT/EP2016/052528, filed Feb. 5, 2016, which claims the benefit of German Application No. 10 2015 102 732.1, filed Feb. 25, 2015. The entire contents of each of the foregoing patent applications are hereby incorporated by reference.

BACKGROUND OF THE INVENTION

1. Technical Field.

The invention relates to a device and a method for checking a fuel rod of a fuel element in a water-filled pool of a nuclear plant.

2. Background and Relevant Art.

During operation of nuclear reactors, individual fuel rods may have defects and develop leaks, as the result of which radioactive fission products may escape into the coolant and increase its radioactivity. This in turn results in an undesirable increase in the radiation exposure in the vicinity of the cooling system. Fuel rods are therefore typically checked for defects every time a fuel rod or fuel element is replaced. For this purpose it is known, for example, to transport the fuel rods, which are not in use and are stored in a water-filled storage pool, in so-called hot cells and inspect them at that location, which is very complex. However, checking in the water-filled pool itself is very difficult, since the measuring devices used are often very sensitive to radiation, and their proper functioning can be ensured only in a water-free environment.

For example, a device for checking a fuel element in a storage pool of a nuclear plant is known from EP 2 208 206 B1, in which the fuel element is checked underwater with a displaceably mounted image detector, such as a camera, and a scale situated in parallel to a longitudinal axis of the fuel element is provided for locating defects in the fuel element.

DE 24 24 431 describes, for example, a device and a method for locating defective fuel rods within a fuel element, in which the fuel element stands in a test container that is stored in a pool of water and covered by a bell, a measuring device being situated in the bell, and the water present in the bell being pressed out by means of a gas stream in order to ensure a water-free space between the measuring device and the fuel rod. However, such a device allows only checking of the upper rod ends or making a distinction between fuel rods that are defective overall and those that are undamaged.

SUMMARY

The object of the invention, therefore, is to provide a device and a method that allow improved checking of a fuel rod in a water-filled pool of a nuclear plant.

The first-mentioned object is achieved with a device for checking a fuel rod of a fuel element in a water-filled pool of a nuclear plant underwater, having the features according to Patent Claim 1.

The device comprises a test container having a first chamber and a second chamber, and a first test device situated in the test container. The test container has at least one inlet opening and at least one outlet opening. In addition, the test container has at least one insertion opening for inserting the fuel rod into the second chamber. The first and the second chambers are connected to one another via a connecting channel, and a valve is situated in the connecting channel.

The test container is lowerable into the water-filled pool in order to check the fuel rod, so that a check in the water-filled pool, for example a storage pool or a cooling pond, may take place underwater. The fuel rod to be checked is insertable into the second chamber through the insertion opening. The first test device is situated in the test container in the first chamber or in direct contact with the first chamber, in particular in an upper area of the first chamber. In other words, the first test device is situated in the test container in such a way that it is spatially separated by the connecting channel from the second chamber into which the fuel rod is insertable. This has the advantage that if water enters, the first test device may be protected from the water via the valve that is situated in the connecting channel and is movable into the closed position. The first test device and the fuel rod are thus situated in different chambers, which are connected to one another by a connecting channel that is closable by a valve situated therein.

A fluid or a gas flows into one of the chambers through the inlet opening, the gas inlet being controllable via a valve, for example. Due to the gas flowing in, the water which is present inside the test container or inside the chambers and/or the connecting channel, and which has entered, for example, due to lowering of the test container into the water-filled pool or the insertion of the fuel rod, may be flushed out through the at least one outlet opening. The inlet opening and the outlet opening are thus fluidically connectable to one another in such a way that the inflowing fluid or gas displaces the water from the chambers or from the interior of the test container and expels it through the outlet opening.

The valve, which regulates the flow of the fluid between the first and second chambers and is movable between an open position and a closed position for protection of the first test device, is, for example, a shutoff valve of the known type.

By use of the device according to the invention, it is thus also possible to check a fuel rod in a pool of water, since a test device which is water-sensitive or which provides reliable measured values only in a water-free environment is protected from water by the time that the water, which has penetrated upon insertion of the fuel rod, is removed from the interior of the test container. For checking the fuel rod with the first test device, the valve is opened and the check is carried out.

The inlet opening as well as the outlet opening may be situated in the second chamber, so that the first chamber is not in contact at all with the water-filled pool. However, without targeted ventilation of the first chamber, there is a risk that after the valve is opened, at least moist air may pass into the first chamber and deposit as condensate on the first test device. To avoid this, the at least one inlet opening preferably leads into the first chamber of the test container, i.e., is situated in a wall of the test container that encloses or forms the first chamber. Supplying the gas after the valve is opened thus expels the water from the entire interior of the test container, i.e., the first chamber, the connecting channel, and the second chamber. Situating the inlet opening in the first chamber has the advantage that the water is always blown out of the interior in the direction of the second chamber, and thus, away from the first test device, so that entry of moisture from the second chamber into the first chamber is largely avoided.

In principle, it would be sufficient to provide the at least one outlet opening in the second chamber. However, it is advantageous when the test container has a first outlet opening in the first chamber and a second outlet opening in the second chamber, i.e., an outlet opening in each of the two chambers. When the inlet opening is likewise situated in the first chamber, gas may continuously flow through the first chamber in which the first test device is situated, so that the first chamber always remains free of water and the first test device is protected. The first chamber may thus also be ventilated in a targeted manner when the valve is still closed.

In one preferred embodiment, the device has a second inlet opening that leads into the second chamber of the test container. An inlet opening as well as an outlet opening are thus associated in each case with the first chamber and with the second chamber, so that both chambers may be ventilated independently of one another. The inlet openings and the outlet openings are each closable by a valve.

In one preferred embodiment, in addition to the insertion opening for inserting the fuel rod into the second chamber, the test container has an exit opening situated behind the insertion opening, relative to an axis. The insertion opening and the exit opening are thus situated in a line, one behind the other. The device and the test container may thus have a more compact design and still carry out a complete check of the fuel rod. The fuel rod is insertable through the insertion opening and removable through the exit opening situated opposite from the insertion opening, so that multiple axial sections of the fuel rod, i.e., areas along its longitudinal axis, may be checked. The fuel rod may thus be moved through the second chamber so that the fuel rod may be checked along its entire length.

The insertion opening and/or the exit opening are/is preferably adjoined in each case by a guide channel formed by the wall of the test container. Such a guide device made up of the opening and the channel facilitates linearly inserting the fuel rod into the second chamber and removing it from the second chamber. The guide channel extends from an insertion opening to the upper end (in relation to the pool) of the test container toward the second chamber. A further guide channel extends from an exit opening in the second chamber to a lower end (in relation to the pool) of the test container.

The first test device is preferably a spectroscopic measuring device, in particular an infrared measuring device such as an infrared camera, an infrared sensor, or some other spectrometric measuring device that detects the radiation, in particular thermal radiation, emitted from the fuel rod. If layers having different heat conduction or different thicknesses are present on the surface of the fuel rod, for example oxide layers or other deposits, these may be displayed by means of infrared technology. For bright surfaces that have been brushed prior to the check, differences in the heat conduction that occur within the cladding tube of the fuel may be detected. These result, for example, from inhomogeneities in the gap region between the pellets and the inner side of the cladding tube, which may be caused, for example, by pellet separation or by fragments that have chipped off from the pellets. A spectral analysis of the spectrum recorded using the spectroscopic measuring device also allows examination or identification of the composition of the material of the fuel rod.

In one preferred refinement of the invention, a second test device is situated in the second chamber of the test container. The second test device is, for example, a conventional camera that is resistant to radiation and insensitive to water. A light source is also preferably situated in the second chamber, so that damage to the fuel rod may first be identified with the second test device prior to a check with the first test device. If the device also has a second inlet opening that leads into the second chamber of the test container, the second chamber may already be vented for the check with the second test device. This has the advantage that the valve may then be opened at any time during the check with the second test device in order to be able to check a position of the fuel rod, to be tested with the first test device, in greater detail without having to ventilate the second chamber beforehand.

To protect the test devices from radiation that is emitted from the fuel rod, in particular γ radiation, it is advantageous for the first and/or the second test device to be enclosed by a shielding device.

Additional protection of the test devices from radiation is achieved in particular by situating at least one mirror in the first chamber and/or in the second chamber of the test container. A mirror situated in the first chamber in the beam path of the first test device, for example, the infrared camera, reduces the effect of radioactive radiation, emitted from the fuel rod, on the check. The mirror is situated in the beam path in such a way that radiation that is emitted from the fuel rod is directed into an entry window of the first test device. A semitransparent mirror or a folding mirror, for example, is suitable as a mirror.

For inserting the fuel rod into the test container and for rotating and moving the fuel rod up and down during the check, the device advantageously includes a handling tool or actuating means such as a gripper, which grips the fuel rod at its upper end and guides it into the second chamber. For this purpose, it is advisable to utilize a handling tool that is already present at the storage pool or cooling pond.

To minimize penetration of water into the test container or into the second chamber when the fuel rod is already inserted, in one advantageous embodiment the device has a sealing device that closes off the second chamber from the water-filled pool. Although the second chamber and the insertion opening and optionally the exit opening are already largely sealed off by the fuel rod itself, the sealing device allows the entry of water during the check to be reduced to a minimum.

The sealing device includes in particular a flexible sealing element which completely encompasses the insertion opening and optionally the exit opening, and the at least one guide channel. In other words, the sealing device closes off a gap that is present between the wall of the test container that forms the guide channel, and the fuel rod. If an upper guide channel and a lower guide channel, i.e., an insertion opening and an exit opening, are present, for example two ring-shaped elements are provided. These are preferably fillable or inflatable with gas, so that when the fuel rod is inserted they may be activated in order to further seal off the openings.

In another preferred embodiment, the test container is designed in such a way that the fuel rod and at least a portion of the handling or actuating means are situated completely within the second chamber, and the interior of the second chamber is sealed off from the water-filled pool via a sealing element. For this purpose, it is possible in principle to design the test container itself in such a way that the fuel rod is completely insertable therein. However, it is advantageous for the test container to have further test housings, having an interior, that are mountable on a top or bottom side of the test container, adjoining the second chamber. In other words, the sealing device includes at least one additional test housing that completely covers the fuel rod and at least a portion of the handling or actuating means outside the test container. The sealing element is situated in the additional test housing, for example in an area of the handling tool, in order to completely seal off the interior, formed by the second chamber and the at least one additional test housing, from the water-filled pool. The sealing element thus closes off a gap that is present between the wall of the additional test housing and the handling tool.

The second mentioned object is achieved with a method for checking a fuel rod of a fuel element in a pool of water of a nuclear plant, having the features according to Patent Claim 16. A device that is designed corresponding to the above-described features is used, so that reference is initially made to the previous discussion.

The fuel rod is initially inserted into the second chamber of the housing through the insertion opening or the guide channel, with the valve closed. This takes place, for example, using the handling tool or actuating tool, which is able to move the fuel rod in the water-filled pool. During this step the test container is already lowered into the water-flooded pool, so that the second chamber of the test container is flooded with water.

A fluid or gas is supplied via the inlet opening of the test container, and flows through the interior of the test container and displaces the water. If the inlet opening is situated in the second chamber, the water that has entered upon insertion of the fuel rod into the second chamber is expelled from the outlet opening, and thus, from the second chamber. If the inlet opening is situated in the first chamber, the fluid flows through the connecting channel into the second chamber as soon as the valve is opened, and displaces the water from the entire interior of the test container. If the inlet opening is situated in the first chamber and the first chamber also has an outlet opening, gas is already supplied during the insertion of the fuel rod into the second chamber in order to preferably keep the first chamber free of water.

To check the fuel rod with the first test device, the valve situated in the connecting channel between the first chamber and the second chamber is opened, so that the fuel rod enters into the visual field of the first test device. When the water has been virtually completely removed from the interior of the test container, the checking of the fuel rod with the first test device takes place.

The gas flow is preferably maintained during the check of the fuel rod, i.e., fluid is continuously supplied to the interior of the test container, to prevent water from penetrating into the first and/or second chamber through one of the outlet openings, and to keep the interior of the test container free of water. The temperature of the supplied fluid is settable, so that the accuracy of the check, which depends essentially on the temperature ratio of the temperature inside the chambers to the surface temperature of the fuel rod, may be positively influenced.

In one advantageous embodiment, the valve is first opened as soon as the sealing device closes off the second chamber from the water-filled pool. When a sealing element corresponding to a ring-shaped, inflatable sealing element that encloses the guide channel is used, it is inflated as soon as the fuel rod is completely inserted in order to further reduce penetration of water through the gap that remains between the wall of the test container and the fuel rod.

In one preferred refinement of the method, after it is inserted into the test container the fuel rod is initially checked with the second test device situated in the second chamber, with the valve closed. During the check, the fuel rod is moved up and down along a direction extending parallel to a longitudinal axis of the fuel rod and/or is rotated about the longitudinal axis so that an inspection at multiple axial sections of the fuel rod can take place. The fuel rod is thus initially inspected with the second test device to determine a relevant partial or longitudinal section of the fuel rod. When a measuring device that is insensitive to water is used as the second test device, this may take place without having to displace the water from the second chamber beforehand.

A closer inspection of this section of the fuel rod is subsequently carried out with the first test device. During the check with the first test device, the infrared camera, for example, the fuel rod remains stationary. The partial section to be inspected is therefore aligned beforehand in such a way that it is in the field of vision of the first test device. For this purpose, the fuel rod is, for example, rotated until the location to be checked is aligned with the viewing direction toward the infrared camera, for example also with the mirror situated in between. To be able to carry out the check with the infrared camera, the sealing device is activated, i.e., for example the two seals are inflated, the water is blown out of the second chamber, and the valve is opened. As the result of such a pre-inspection using an additional test device, the level of effort for a measurement with the first, water-sensitive test device, for example the infrared measuring device, is greatly reduced.

BRIEF DESCRIPTION OF THE DRAWINGS

The invention is explained in greater detail below, also with regard to further features and advantages, with reference to the description of exemplary embodiments and the appended drawings, which in each case show schematic diagrams as follows.

DETAILED DESCRIPTION

Figure 1:
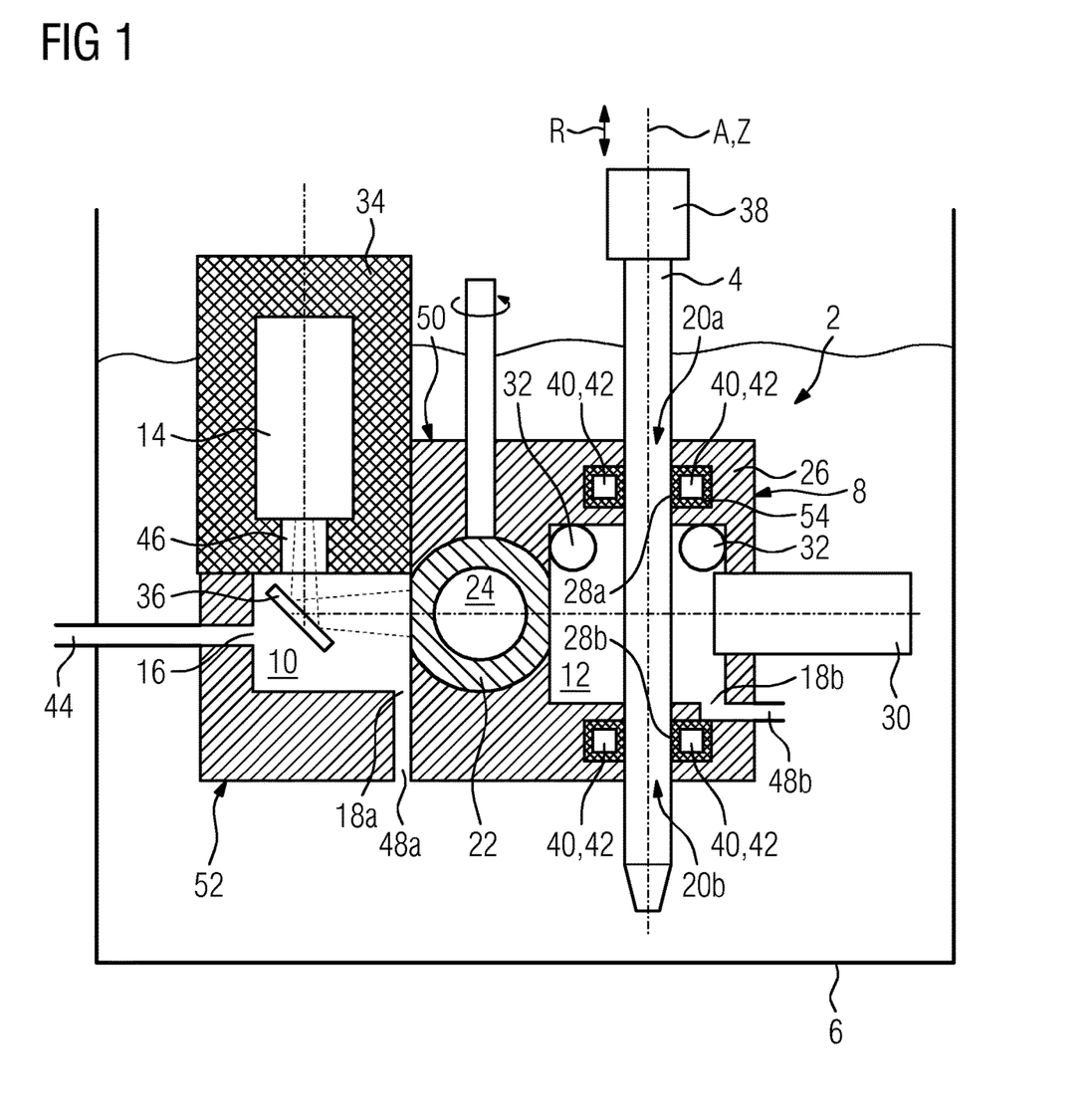
FIG. 1 shows a device for checking a fuel rod of a fuel element, with the valve closed.

FIG. 1 shows a device 2 for checking a fuel rod 4 of a fuel element (not illustrated) in a water-filled pool 6 of a nuclear plant, with the fuel rod 4 inserted and a valve 24 closed.

The device 2 includes a test container 8 that is lowered into the water-flooded pool 6. The test container 8 has an interior that is formed by a first chamber 10, a second chamber 12, and a connecting channel 22. A valve 24, in the present case a shutoff valve, which is movable between an open position (FIG. 2) and a closed position (FIG. 1) for opening and closing the connecting channel 22, and thus, for establishing a fluidic connection between the first chamber 10 and the second chamber 12, is provided in the connecting channel 22.

An infrared measuring device or an infrared camera as the test device 14 is situated in the first chamber 10. To protect the radiation-sensitive test device 14 from the radioactive radiation emitted from the fuel rod 4, the test device 14 is enclosed by a shielding device 34. The test device 14 is situated in parallel to the fuel rod 4, so that the exit or entry window 46 of the test device for the infrared radiation points in the direction of the second chamber 12.

Gas flows into the first chamber via a first inlet line 44 and a first inlet opening 16 that is present in the wall 26 of the first chamber 10. A second inlet opening 44 and a second inlet opening 16 may be provided in the wall 26 of the second chamber 12, which open into the second chamber 12 and by means of which the second chamber 12 may be separately ventilated. Present in the wall 26 that surrounds the first chamber 10, at the bottom side 52 of the test container 8, is an outlet opening 18a that leads into the water-flooded pool 6 via an outlet channel 48a. An outlet opening 18b, which once again leads into the water-flooded pool 6 via an outlet channel 48b, is also present in the side of the wall 26 surrounding the second chamber 12.

The test container 8 has an insertion opening 20a on a top side 50 for inserting the fuel rod 4 into the second chamber 12. An exit opening 20b that is situated behind the insertion opening 20a, relative to the axis Z that extends in parallel to a center longitudinal axis A of the fuel rod, is used for removing the fuel rod 4 from the chamber 12, so that the fuel rod 4 can be moved through the chamber 12 to enable checking of multiple axial sections extending in parallel or along a center longitudinal axis A of the fuel rod 4. The insertion opening 20a and the exit opening 20b are adjoined by a guide channel 28a, b, respectively, that is formed by the wall 26 of the test container 8, the guide channel 28a leading from a top side 50 of the test container 8 into the second chamber 12, and the guide channel 28b leading from the second chamber 12 to a bottom side 52 of the test container 8. The guide channel 28a, b prevents excessive tilting of the fuel rod 4 so that it may be led in and out of the second chamber 12 more easily.

The device 2 also includes a second test device 30 that is situated in the second chamber 12 of the test container 8 in such a way that the inserted fuel rod 4 is in the field of vision of the second test device. In the present case, the second test device 30 is a camera that is insensitive to radiation, so that no shielding device 34 is required. A light source 32 is provided in the second chamber 12 for checking the fuel rod 4 with the second test device 30.

A mirror 36 is situated in the first chamber 10 for directing the thermal radiation emitted from the fuel rod 4 into the entry window 46 of the first test device 14 or the infrared camera. The radiation exposure for the first test device 14 may be further reduced by the mirror 36, since the first test device is not directly exposed to the radioactive radiation that is emitted from the fuel rod 4.

For inserting the fuel rod 4 into the test container 8 and moving it parallel to a direction R and rotating it about a longitudinal axis A of the fuel rod 4 during the check, the device includes a handling tool 38, a gripper, for example, which is already present for transporting the fuel rods 4 in the water-flooded pool 6.

Figure 2:
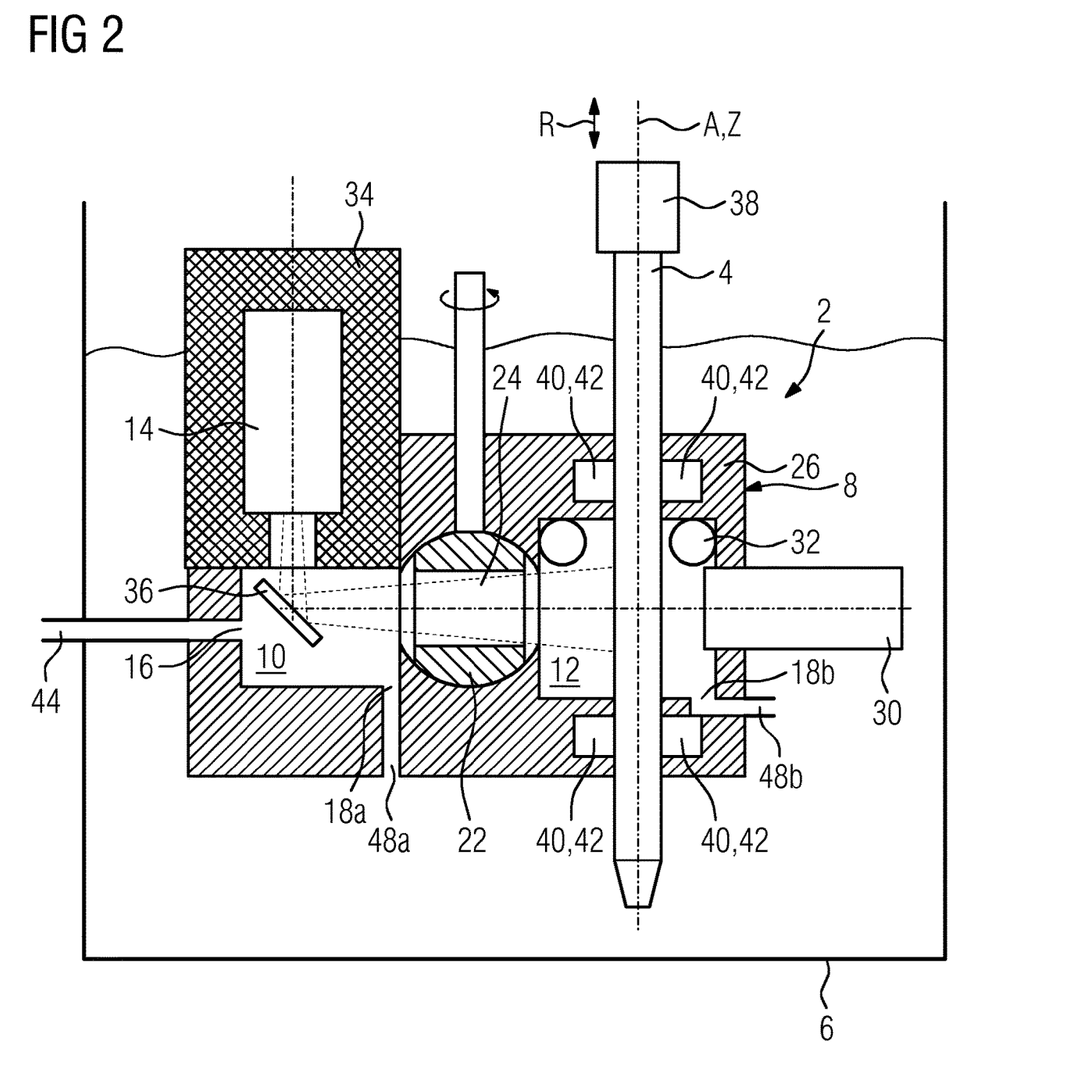
FIG. 2 shows a device for checking a fuel rod of a fuel element, with the valve open.

The device 2 also includes a sealing device 40 via which the second chamber 12 may be closed off from the water-filled pool 6. The sealing device 40 includes two sealing elements 42, situated in each case in a recess 54 in the wall 26 of the test container 8 adjoining the guide channel 28a, b, and each completely enclosing a guide channel 28a, b. The sealing elements 42, as illustrated in FIG. 2, are fillable with gas or a liquid medium, so that a gap that may be present between the inserted fuel rod 4 and the guide channel 28a, b is completely closable.

For checking the fuel rod 4 in the water-flooded pool of the nuclear plant, the fuel rod 4 is inserted into the second chamber 12 of the test container 8 through the insertion opening 20a, with the valve 24 closed (FIG. 1). Gas is supplied via the inlet channel 44 and the inlet opening 16 in order to displace the residual water from the second chamber 10 and to avoid entry of water through the outlet opening 18a and the outlet channel 48a. Supplying of the gas is maintained during the check of the fuel rod 4.

When the fuel rod 4 is completely inserted, a check with the second test device 30, situated in the second chamber 12, initially takes place with the valve 24 still closed and the light source 32 switched on. For checking multiple axial sections or the entire surface of the fuel rod 4, during the check with the second test device 30 the fuel rod is moved up and down in parallel to the direction R and rotated about its longitudinal axis A.

If a location to be examined in greater detail is detected during the check with the second test device 30, an additional check with the first test device 14 then takes place. In principle, however, it would also be possible to check the entire fuel rod 4 with the first test device 14.

For checking the fuel rod with the first test device 14, the fuel rod is rotated by 180° by means of the handling tool 38, so that the surface position to be checked is facing the first test device 14. The two sealing elements 42 are filled with air to avoid entry of water. The valve 24 is subsequently opened (FIG. 2), so that the gas flowing through the first inlet opening passes through the first chamber 10 and the connecting channel 22 and into the second chamber 12, where it displaces the water from the chamber 12. During checking of the fuel rod 4 with the first test device 14, the entire interior of the test container 8, i.e., the first chamber 10, the connecting channel 22, and the second chamber 12, is thus free of water, thereby ensuring the functionality of the infrared measurement.

Figure 3:
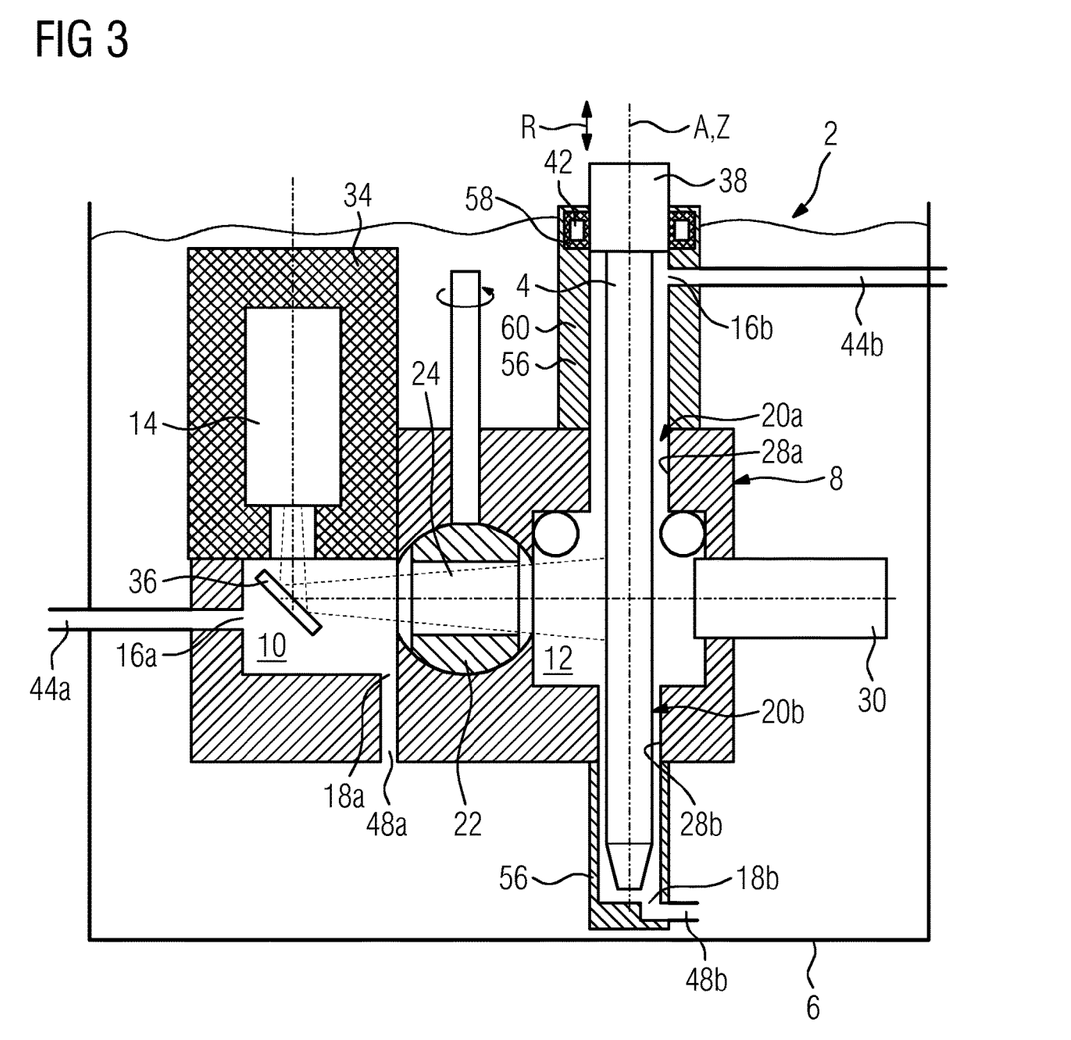
FIG. 3 shows a device for checking a fuel rod of a fuel element having an additional test housing, with the valve open.

FIG. 3 shows a device 2 in which the sealing device 40 includes two additional test housings 56 which completely cover the fuel rod 4 and at least a portion of the handling or actuating means 38 outside the test container 8. The test housings 56 are mounted on the test container in such a way that an interior of the test housings 56 and the second chamber 12 form a shared interior.

The sealing device 40 also includes a sealing element 42 which is fillable with gas or a liquid medium, and which is situated in a recess 54 in the wall 58 of the additional test housing 56 and completely encompassed by the guide channel 28a jointly formed by the wall 58 of the additional test housing 56 and the wall 26 of the test container. For better clarity of the illustration, the sealing element 42, despite the inserted fuel rod 4 and the opened valve 24, is shown in an unfilled state.

The device includes a first inlet channel 44a that opens into the first chamber 10 and a first inlet opening 16a in the first chamber 10, as well as a second inlet channel 44b that opens into the second chamber 12 and a second inlet opening 16b in the second chamber 12. Fluid may thus flow through each chamber 10, 12 independently of the other chamber, and the residual water that is present may be removed from the chambers. According to FIG. 3, the second inlet channel 44b is formed by the wall 60 of the additional test housing 56, and the inlet opening 16b opens into the guide channel 28b in an upper area of the additional test housing 56. The test container [sic; test housing] 56 situated on the bottom side 52 has an outlet opening 18b in a lower area. To ensure sufficient fluid flow in the second chamber 12, the guide channel 28b is wider than the diameter of the fuel rod 4. The second chamber 12 may thus be completely vented in the direction of the outlet opening 18b.

Directly after the fuel rod is inserted and the additional test housing 56 is mounted, the water may be blown out of the second chamber 12, so that a check or pre-inspection of the fuel rod 4 with the second test device 30 also takes place in a water-free environment. For checking a position of the fuel rod 4 to be examined in greater detail, the valve 24 may then be opened at any time during the check with the second test device to enable a check with the first test device 14 without having to also ventilate the second chamber beforehand, thus saving time.

| List of reference numerals | |
|---|---|
| 2 | device |
| 4 | fuel rod |
| 6 | pool |
| 8 | test container |
| 10 | first chamber |
| 12 | second chamber |
| 14 | first test device |
| 16 | inlet opening |
| 18a, b | outlet opening |
| 20a | insertion opening |
| 20b | exit opening |
| 22 | connecting channel |
| 24 | valve |
| 26 | wall of the test container |
| 28 | guide channel |
| 30 | second test device |
| 32 | light source |
| 34 | shielding device |
| 36 | mirror |
| 38 | handling tool |
| 40 | sealing device |
| 42 | sealing element |
| 44 | inlet channel |
| 46 | exit or entry window |
| 48a, b | outlet channel |
| 50 | top side |
| 52 | bottom side |
| 54 | recess |
| 56 | test housing |
| 58 | wall |
| R | direction |
| A | longitudinal axis |
| Z | axis |

The invention claimed is:

1. An underwater nuclear fuel rod inspection apparatus, comprising:
    a test container configured to be submerged in a water-filled pool, the test container comprising a first chamber and a second chamber;
    a spectroscopic measuring device in the first chamber;
    an insertion opening in the second chamber, the insertion opening configured to insert a fuel rod into the second chamber;
    at least one inlet opening and at least one outlet opening configured to provide gas flow through the test container and to disperse water from the second chamber; and
    a channel connecting the first and second chambers, the channel comprising a valve configured to place the first and second chambers in fluid communication and place the spectroscopic measuring device in the first chamber in operable communication with the fuel rod in the second chamber.

2. The device according to claim 1, wherein the at least one inlet opening leads into the first chamber of the test container.

3. The device according to claim 1, wherein the at least one outlet opening comprises a first outlet opening in the first chamber and a second outlet opening in the second chamber.

4. The device according to claim 3, wherein the at least one inlet opening comprises a second inlet opening that leads into the second chamber of the test container.

5. The device according to claim 1, wherein the test container has an exit opening situated opposite the insertion opening, the exit opening and the insertion opening being aligned along an axis passing through the respective centers of the exit opening and the insertion opening.

6. The device according to claim 5, further comprising at least one guide channel, formed by a wall of the test container, which adjoins one or more of the insertion opening or the exit opening.

7. The device according to claim 6, further comprising a sealing device configured to selectively close off the second chamber from the water-filled pool.

8. The device according to claim 7, in which the sealing device includes at least one sealing element that completely encompasses the at least one guide channel.

9. The device according to claim 7, in which the sealing device includes at least one additional test housing that completely covers the fuel rod and at least a portion of a handling or actuating tool outside the test container.

10. The device according to claim 1, wherein the spectroscopic measuring device comprises an infrared measuring device.

11. The device according to claim 1, further comprising a second test device that is situated in the second chamber of the test container.

12. The device according to claim 11, further comprising a light source that is situated in the second chamber.

13. The device according to claim 11, in which one or more of the spectroscopic measuring device or the second test device is enclosed by a shielding device.

14. The device according to claim 1, further comprising at least one mirror that is situated in one or more of the first chamber or in the second chamber of the test container.

15. The device according to claim 1, further comprising a handling tool for inserting the fuel rod into the test container and for moving and rotating the fuel rod.

16. A method for inspecting an underwater nuclear plant using an underwater nuclear fuel rod inspection apparatus comprising:
    a test container configured to be submerged in a water-filled pool, the test container comprising a first chamber and a second chamber;
    a spectroscopic measuring device in the first chamber;
    an insertion opening in the second chamber, the insertion opening configured to insert a fuel rod into the second chamber;
    at least one inlet opening and at least one outlet opening configured to provide gas flow through the first chamber and to disperse water from the second chamber; and
    a channel connecting the first and second chambers, the channel comprising a valve configured to place the first and second chambers in fluid communication and place the spectroscopic measuring device in the first chamber in operable communication with the fuel rod in the second chamber;
    the method comprising:
    inserting the fuel rod into the second chamber of the test container through the insertion opening;
    with the valve closed, supplying a fluid via the at least one inlet opening, and
    opening the valve and checking the fuel rod with the spectroscopic measuring device.

17. The method according to claim 16, further comprising maintaining the supplying of the fluid during the checking of the fuel rod.

18. The method according to claim 16, further comprising opening the valve as soon as a sealing device closes off the second chamber from the water-filled pool.

19. The method according to claim 16, further comprising checking the fuel rod with a second test device with the valve closed, the fuel rod being one or more of moved up and down along a direction or rotated about a longitudinal axis during the checking of the fuel rod with the second test device.

\* \* \* \* \*